United States Patent
Porikli et al.

(10) Patent No.: US 7,961,952 B2
(45) Date of Patent: Jun. 14, 2011

(54) METHOD AND SYSTEM FOR DETECTING AND TRACKING OBJECTS IN IMAGES

(75) Inventors: Fatih M. Porikli, Watertown, MA (US); Oncel C. Tuzel, Piscataway, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 929 days.

(21) Appl. No.: 11/862,554

(22) Filed: Sep. 27, 2007

(65) Prior Publication Data

US 2009/0087023 A1    Apr. 2, 2009

(51) Int. Cl.
    *G06K 9/46* (2006.01)
(52) U.S. Cl. ......... 382/209; 382/254; 382/155; 347/131
(58) Field of Classification Search .......... 382/209, 382/248, 253, 276, 277, 280, 281, 302
    See application file for complete search history.

(56) References Cited

U.S. PATENT DOCUMENTS

| | | | | |
|---|---|---|---|---|
| 5,263,107 A * | 11/1993 | Ueda et al. | ..................... | 382/157 |
| 5,412,738 A * | 5/1995 | Brunelli et al. | ............... | 382/115 |
| 5,640,492 A * | 6/1997 | Cortes et al. | ..................... | 706/20 |
| 6,112,195 A * | 8/2000 | Burges | .............................. | 706/20 |
| 6,134,344 A * | 10/2000 | Burges | .......................... | 382/155 |
| 6,803,933 B1 * | 10/2004 | Staelin et al. | .................. | 347/131 |
| 7,174,040 B2 * | 2/2007 | Lienhart et al. | ............... | 382/155 |
| 7,751,643 B2 * | 7/2010 | Zavadsky et al. | ............. | 382/274 |
| 2006/0140497 A1 * | 6/2006 | Kondo et al. | .................. | 382/254 |
| 2008/0063285 A1 * | 3/2008 | Porikli et al. | .................. | 382/190 |

OTHER PUBLICATIONS

David G. Lowe: "Distinctive Image Features from Scale-Invariant Keypoints," Jan. 5, 2004.

* cited by examiner

*Primary Examiner* — Wesley Tucker
*Assistant Examiner* — Aklilu k Woldemariam
(74) *Attorney, Agent, or Firm* — Dirk Brinkman; Gene Vinokur

(57) ABSTRACT

Invention describes a method and system for detecting and tracking an object in a sequence of images. For each image the invention determines an object descriptor from a tracking region in a current image in a sequence of images, in which the tracking region corresponds to a location of an object in a previous image. A regression function is applied to the descriptor to determine a motion of the object from the previous image to the current image, in which the motion has a matrix Lie group structure. The location of the tracking region is updated using the motion of the object.

14 Claims, 7 Drawing Sheets

100

Input: Location of target at time $t-1$ is $M_{t-1}$ and the current observation is $I_t$.

- $j = 1$ and $M_{t,1} = M_{t-1}$
- Repeat
  - $\Delta M_{t,j} = f(o_t(M_{t,j}^{-1}))$
  - $M_{t,j+1} = M_{t,j} . \Delta M_{t,j}$
  - $j = j + 1$
- Until $\Delta M_t == I$ or $L(M_{t,j-1}, t) > L(M_{t,j}, t)$
- $M_{t,j} = M_{t,j-1}$

Fig. 6

METHOD AND SYSTEM FOR DETECTING AND TRACKING OBJECTS IN IMAGES

FIELD OF THE INVENTION

This invention relates generally to tracking objects in a sequence of images, and more particularly to detecting and tracking objects moving non-linearly.

BACKGROUND OF THE INVENTION

Tracking is the process of estimating a motion of an object in a sequence of images. Object tracking methods generally require that first the object is detected in some initial image. Then, the object can be tracked in subsequent images. The variety of object detecting methods is too large to enumerate. Tracking methods can be classified as state-space estimator methods or model alignment methods.

State-Space Estimator Method

State-space estimator methods typically use a Markovian process and construct a probability density function (pdf) of motion parameters. For example, Kalman filtering uses a normal distribution. However, the Kalman filtering method fails to describe multi-modal distributions.

Monte Carlo integration methods, e.g., particle filters, can track any parametric variation including object pose. However, the methods dependency on random sampling tends to degenerate estimated likelihoods, especially for higher dimensional representations. Moreover, the methods computational requirements grow exponentially by the number of state variables, which makes the methods unsuitable for tracking complex pose changes.

Model Alignment Method

Model alignment methods define a cost function based on a difference between an object model and an object as seen in an image. The cost function is solved by minimizing motion parameters. One example is optical flow estimation, where a sum of squared differences between the object model and the image intensities are minimized as an iterative least squares problem. A major difficulty of the method is that the method requires computation of the image gradients, the Jacobian and the Hessian matrices, for each iterations, which makes the method slow.

Other model alignment methods overcome the difficulty by alternative formulations of the motion and the cost function relation. In some methods, the motion is estimated using a linear function of the image gradient, which is learned in an off-line process. That idea is extended to learn a non-linear mapping from images to the motions using relevance vector machine.

But, those methods estimate the additive updates to the motion parameters via linearization. Thus, those methods cannot track non-linear motions.

Lie Group Theory for Motion Estimation

Lie algebra can be used to find modes of a distribution having Euclidean motion group structure, for rigid motion estimation using a mean shift operation. It is known that the mean shift can fail when the motion is large. A vector addition operation is defined on the Lie algebra to integrate series of affine motions for tracking an affine 'snake'.

Additive updates are performed on the Lie algebra for template tracking. However, that approach fails to account for the non-commutativity of the matrix multiplications and the estimations are only valid near the initial transformation of the object.

It is desired to track an object in a sequence of images while the object moves non-linearly. It is also desired to detect the object in an initial image. Furthermore, it would be advantageous if the methodology that underlies the detecting and tracking could be the same.

SUMMARY OF THE INVENTION

The embodiments of the invention provide a method for detecting and tracking an object in a sequence of image. During training, a regression function $f$ is determined. The regression function correlates object descriptors to object motions. In a preferred embodiment, the descriptors are orientation histograms. Orientation histograms are relatively insensitive to changes in pixel intensities and precise for large object motions. The object motions have a matrix Lie group structure. The motions include most common transformation such as Euclidean motion, similarity transform, affine motion and planar homography.

Because the motions do not lie on a Euclidean space, the regression function determines the geometry of the underlying space by minimizing an error function. Prior alt methods linearize motion, which makes an implicit Euclidean space assumption. This is not true for non-linear motion. Therefore, the invention uses a matrix Lie group structure for describing the motion of the object.

The invention constructs a model of the object motion on the Lie algebra. The model minimizes a first order approximation to a sum of a squared geodesic error. The invention uses ridge regression to update the object model, which enables accurately learning of the object motion even with a small training set of images. The method is computationally efficient and works in real-time.

The object can also be detected in an initial target image of the sequence. After the object has been detected, the object can be tracked. The embodiments of the invention use the same regression function and Lie algebra stricture to perform both the object detection and the object tracking.

BRIEF DESCRIPTION OF THE DRAWINGS

FIG. 6 is a block diagram of pseudo code for a tracking method according to an embodiment of the invention;

DETAILED DESCRIPTION OF THE PREFERRED EMBODIMENT

Method Overview

Figure 1:
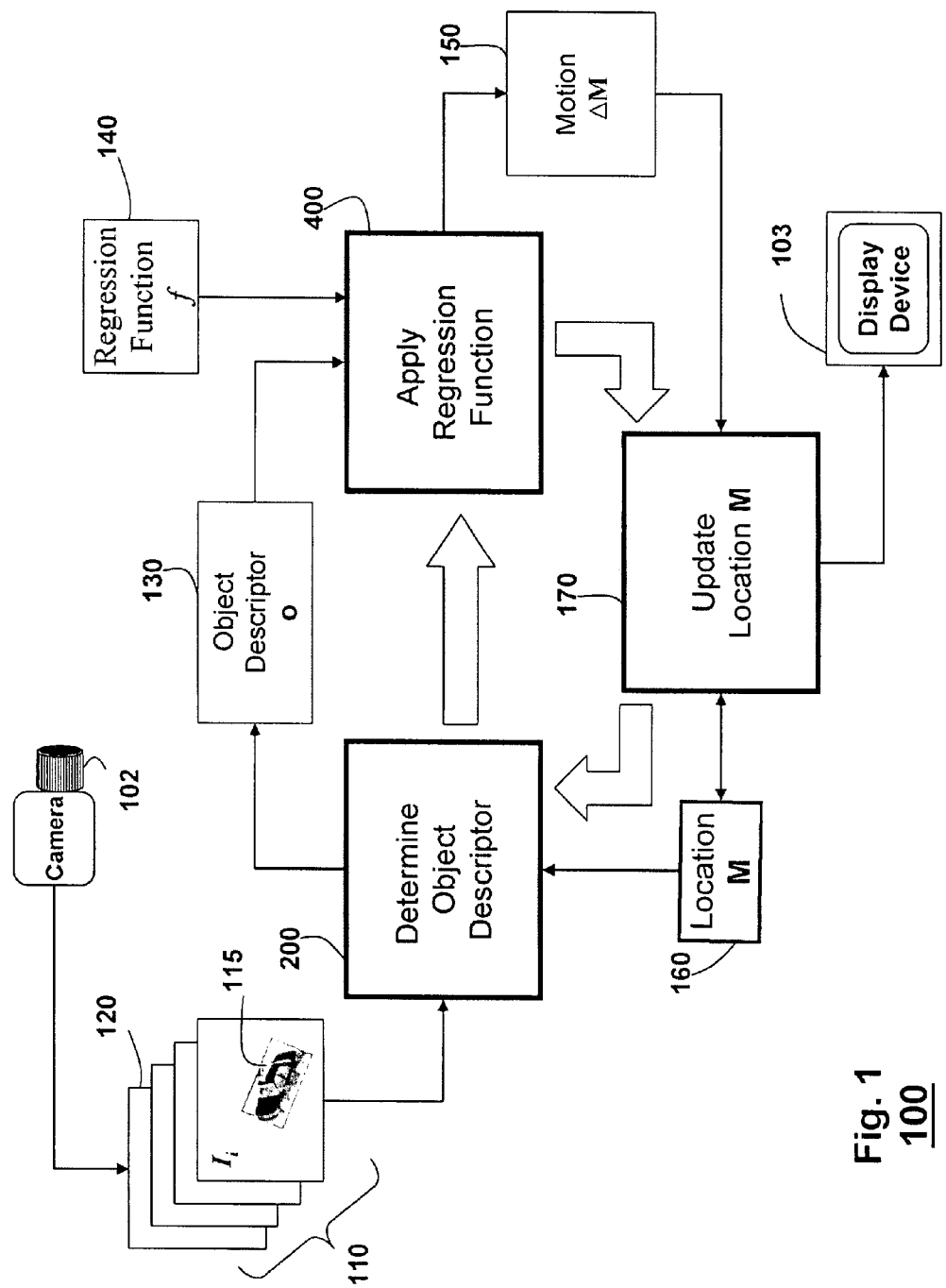
FIG. 1 is a flow diagram of a method for tracking an object in a sequence of the images according to an embodiment of the invention.

FIG. 1 shows a method and system 100 for tracking a moving object 115 in a sequence of images $I_t$ 110 according to the embodiments of the invention. The sequence of the images 110 can be acquired by a camera 102. Alternatively, the sequence 110 can be provided to the method 100 from persistent memory or a communication interface. Without a loss of generality, the method 100 is described for non-linear motion of the object 115. However, the method can track objects with any type of motion.

The method 100 can operate in a processor or microprocessor connected to a display device 103, such as a television, projector, playback device, the camera, or computer as known in the art. The display device can be used to view the motion of the object by a user of the system. Computers typically include one or more processing units and/or microcontroller, memories, and input/output interfaces connected by buses. The memories can include volatile memories, e.g., RAM, for storing current images as described below. The processor can also have access to persistent memory, e.g., removable storage media such as video tapes and DVD storing the sequence of images 110, as well as communication interface, such as set-top boxes, network interfaces and the like. It should be understood, that the method can also track objects when the sequence of images 110 is acquired in real-time.

Input to our method is a sequence of images. An initial image that includes the object can be called the training image. Subsequent images, where the object needs to be detected or tracked, can be called target images. For object detection, the sequence can be limited to the training image and one target image. For each current (target) image 120 in the sequence of images 110, we determine 200 an object descriptor 130 at a location 160. The location 160 corresponds to a location of the object 115 in a previously processed image. As we describe below, the location of the object is defined by a tracking region, which surrounds the object in the image in image coordinates.

Next, we apply 400 a regression function $f$ 140 to the object descriptor 130. Because the function and the descriptor are matrices, the application is basically a matrix multiplication. Output of the application of the regression function is a motion $\Delta M$ 150. The motion $\Delta M$ 150 corresponds to the motion of the object 115 from the previous image to the current image 120.

The motion 150 is used to update 170 the location of the tracking region in the current image. The tracking region at the updated location can then be used for tracking the object in a next (current) image in the sequence 110.

Tracking Method Formalization

The embodiments of the invention are described for parametric motion transformation A(2) of the object 115. The parametric transformation is a function of parameters applied to the given variables. The variables include the pixel features, the region features, the pixel coordinates, and the region coordinates. The parameters include, e.g., affine, perspective motion transformations, and other linear and non-linear, rigid and non-rigid motion transformation that can be represented by a finite number of parameters. The invention can also be used with other motion transformations, e.g., similarity transform S(2), and Euclidean motion SE(2).

A two-dimensional parametric transformation A(2) is given by a 3×3 matrix $$M = \begin{pmatrix} A & b \\ 0 & 1 \end{pmatrix}, \quad (1)$$

where A is a non-singular 2×2 matrix for representing rotation, scale and skew, and $b \in \Re^2$. The set of all parametric transformations forms a matrix Lie group structure. The Lie group is a differentiable manifold. Operations on the group are compatible with a smooth structure. Because Lie groups are manifolds, they can be operated on by differential calculus. A global Lie group can be replaced by a local or linearized version known as its Lie algebra. The Lie algebra is an algebraic structure that can be used to operate on geometric objects such as Lie groups and differentiable manifolds.

Figure 2:
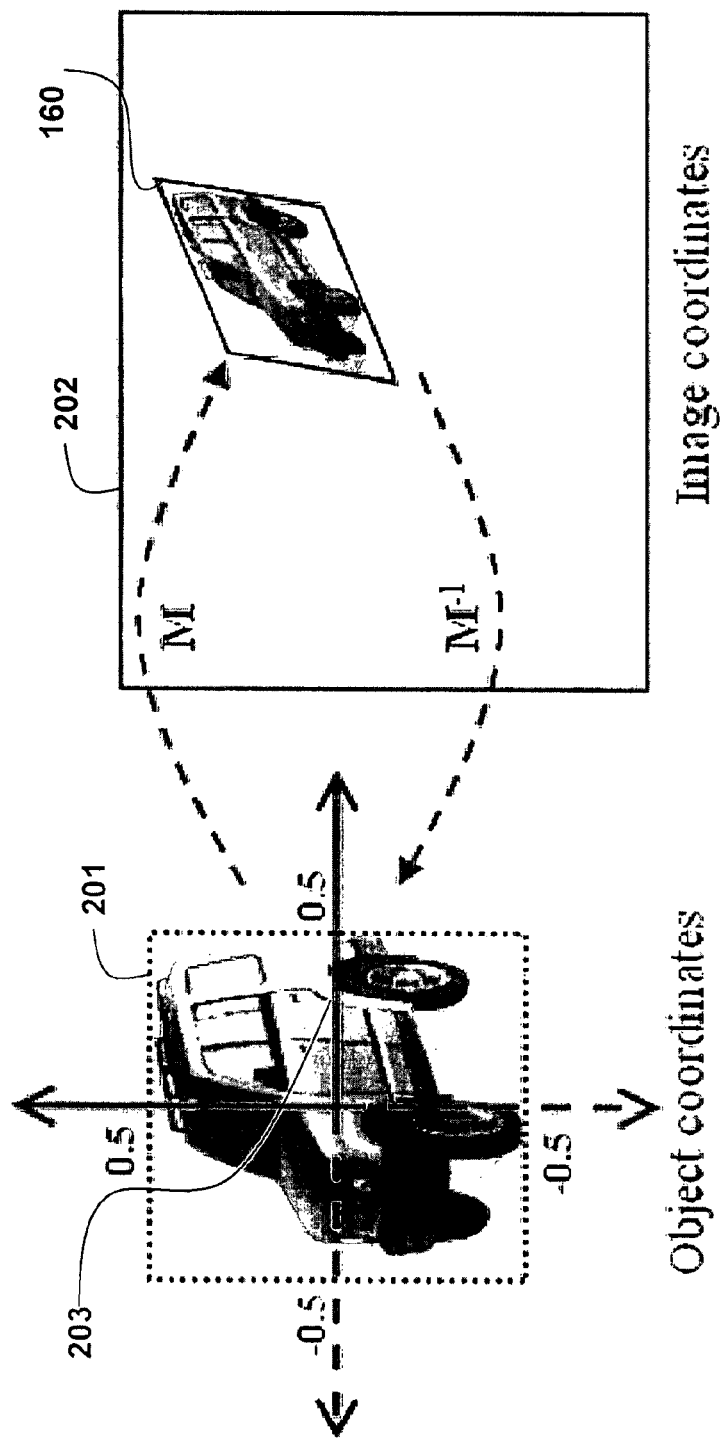
FIG. 2 is a schematic of a bi-directional transformation between the object in object coordinates and the object in image coordinates according to an embodiment of the invention.

FIG. 2 shows a bidirectional location transformations M and $M^{-1}$ of the location of the object 115 in object coordinates and image coordinates. The location of the object 115 in the object coordinates is a unit square 201. The location of the object 115 in the image coordinates is a tracking region 160 of the image 202. The affine matrix M transforms the unit square 201 at an origin of coordinates 203 to the tracking region 160 enclosing the object in the image according to $$[x_{img} y_{img} 1]^T = M[x_{obj} y_{obj} 1]^T, \quad (2)$$

where, the subscripts indicate the object coordinates (obj) and image coordinates (img), respectively. The inverse transform $M^{-1}$ is also an affine matrix and transforms the object in the image coordinates 160 to the object in the object coordinates 201.

Let I denote the input images 110, and t is the time (frame) index. The tracking estimates the location transformation matrix $M_t$, given the images LIP to time t, i.e., $I_{0 \ldots t}$, and an initial location transformation $M_0$. A method for detecting the object in an initial image is described below.

The location transformation matrix $M_t$ defines the location of the tracking region 160 at the time t in the object coordinates. We model the location transformations matrix as $$M_t = M_{t-1} \cdot \Delta M_t, \quad (3)$$

and estimate the motion transformations $\Delta M$ at each time (frame) t. The motion transformation $\Delta M$ corresponds to motion of object from time t−1 to time t in the object coordinates 203.

The image in the object coordinates is $I(M^{-1})$. We consider pixel values inside the tracking region 160 and represent the region with a descriptor, e.g., gradient orientation histograms. The descriptor (observation) is $o(M^{-1}) \in \Re^m$ where m is a dimension of the descriptor o 130.

We define tracking as a matrix valued regression problem. Given the previous location of the object as indicated by location transformation matrix, i.e., the tracking region, of the previously processed image $M_{t-1}$, and the current image $I_t$, we estimate an motion transformation $\Delta M_t$ 150 using the regression function 140

$$\Delta M_t = f(o_t(M_{t-1}^{-1})). \quad (4)$$

Thus, the tracking is reduced to training and updating the regression function $f$ 140, as described below.

Object Descriptor

Figure 3:
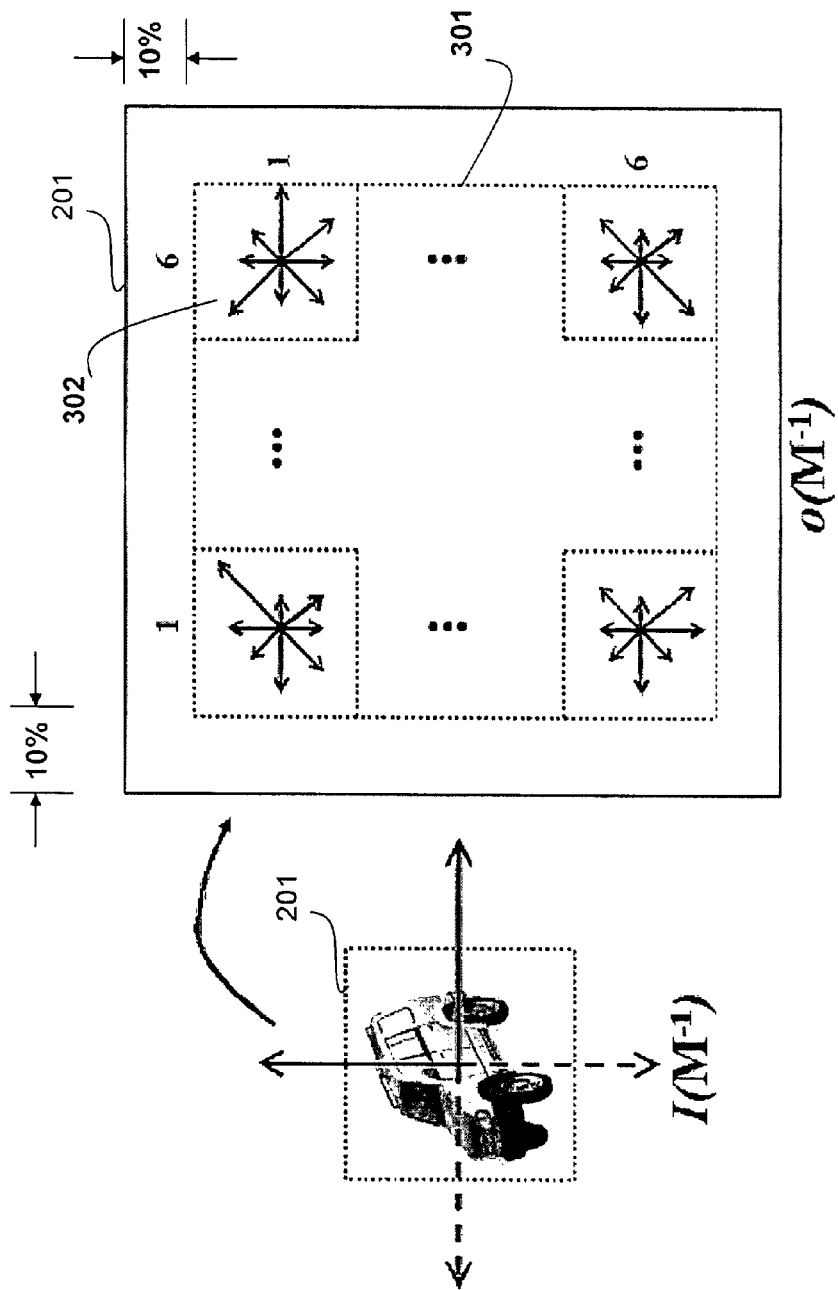
FIG. 3 is a block diagram of a representation of a tracking region with orientation histograms according to an embodiment of the invention.

FIG. 3 shows a representation of the unit square 201 enclosing the object 115. The unit square includes several gradient orientation histograms determined at a regular grid inside the unit square 201 in the object coordinates. Similar to scale invariant feature transform (SIFT) descriptors, the contribution of each pixel to the histogram is proportional to the gradient magnitude of the pixel. The unit square 301 is partitioned into 6×6=36 blocks 302 and a histogram is determined for each block, see D. Lowe, "Distinctive image features from scale-invariant Keypoints," Intl. J. of Comp. Vision, 60(2):91-10, 2004, incorporated herein by reference.

Orientations in each histogram are quantized at $\pi/6$ degrees between 0 and $2\pi$ degrees. Therefore, each histogram is twelve-dimensional, and the object descriptors o are 432 dimensional. During tracking, peripheral pixels in the tracking region are frequently affected by the background. Thus, in one embodiment of the invention, we leave a 10% boundary near the periphery of the tracking region, and determine the descriptor of the object inside the unit square 301.

Regression Function

Figure 4:
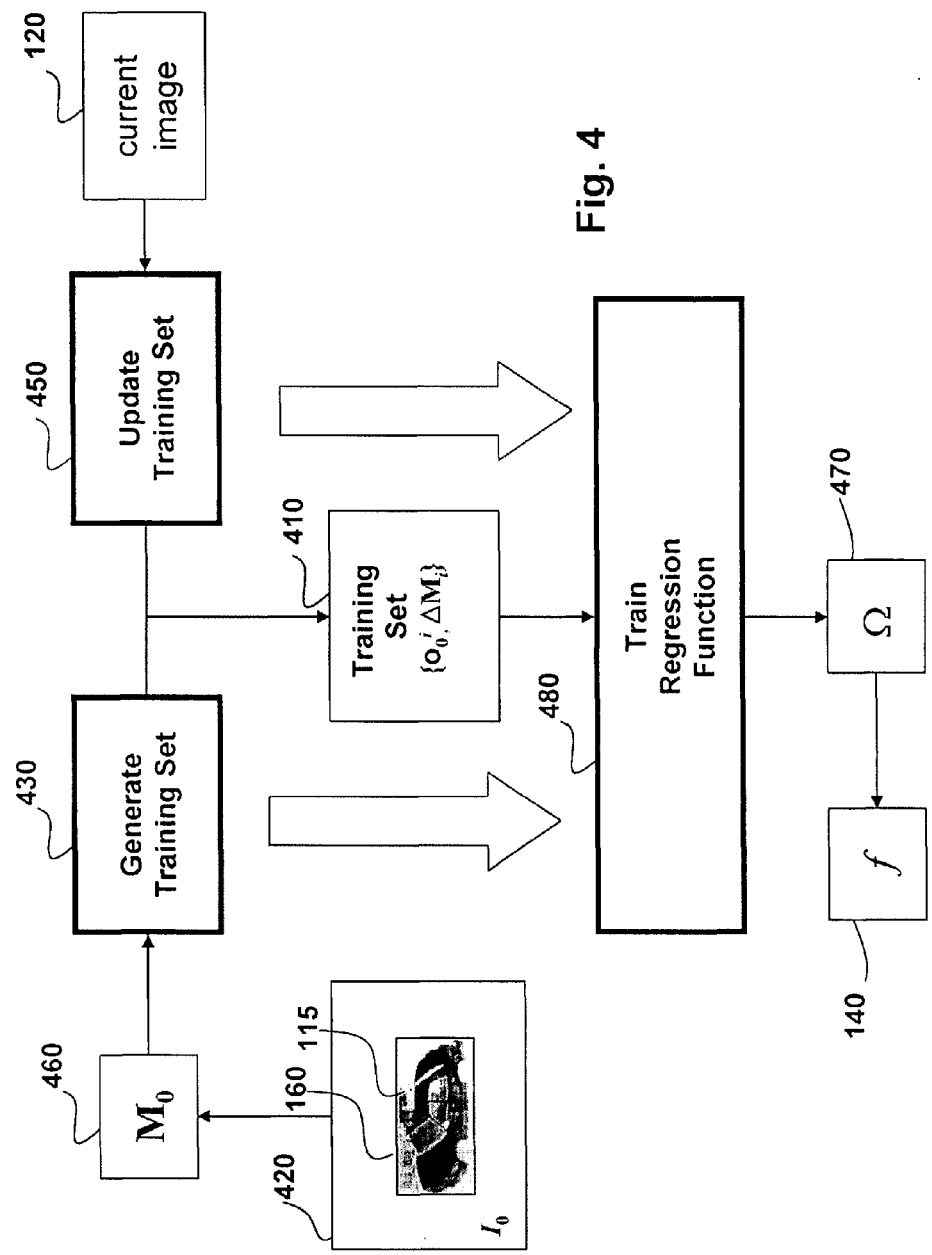
FIG. 4 is a block diagram of a method for training a regression function according to the embodiments of the invention.

FIG. 4 shows a method for training the regression function $f$ 140 according to the embodiments of the invention. The result of the training is an estimation of regression coefficients $\Omega$. The regression coefficients correlate the object descriptors o with the motion transformations $\Delta M$. The way that the regression function is trained and applied to images is the same for the object tracking and the object detecting.

Training Set

During the training, an initial location of the object 115 is approximated by an initial tracking region 160 in an initial (training) image $I_0$ 420 of the sequence 110. The tracking region 160 indicates generally the location of the object 115 according to the image coordinates. Accordingly, the location transformation matrix $M_0$ 460 of the location of the object 115 in the object coordinates is also known. For object detection, the training is supplied with the training image that includes the object, see FIG. 7.

We generate 430 a set of n random parametric motion transformation matrices $\{\Delta M\}_{i=1 \ldots n}$ based on the initial location of the object $M_0$ 460. Each matrix describes a possible motion, e.g., shift, rotation, scale, skew and combination thereof, of the object 115 from the initial location $M_0$ 460. The object 115 at location $M_0$ 460 is transformed by multiplying by the motion transformation $\Delta M_i^{-1}$. The new descriptors are $o_0^i = o_0(\Delta M_i^{-1} \cdot M_0^{-1})$. The motion transformation $\Delta M_i$ moves the object to the unit square 201. Each motion transformation $\Delta M$ is associated with the descriptor o of the object 115 at the location $M_0$ 460. The motion transforms determine a training set 410. The training set 410 include n samples of $\{o_0^i, \Delta M_i\}$.

Figure 5:
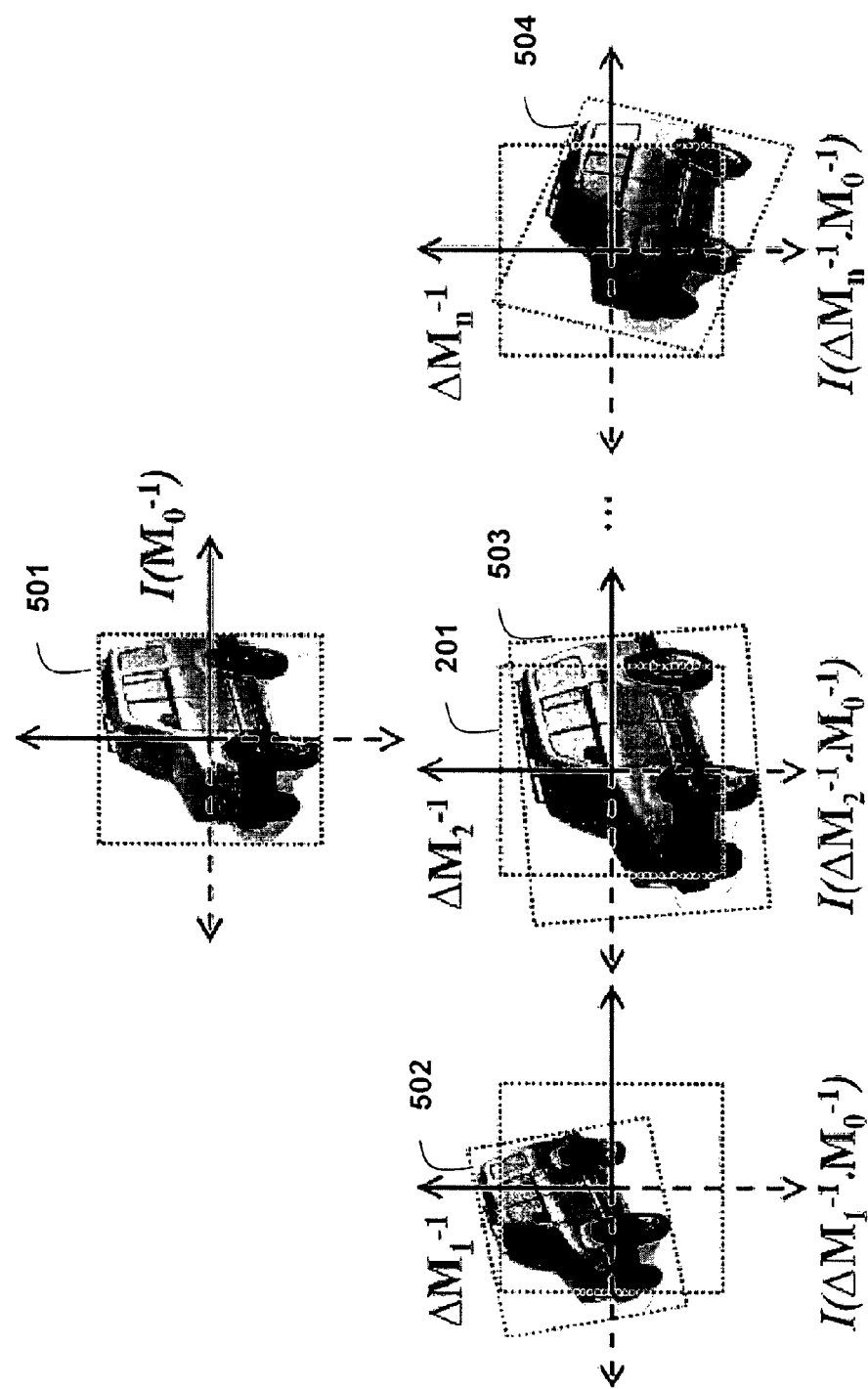
FIG. 5 includes images of a training set according to an embodiment of the invention.

FIG. 5 shows examples 501-504 of the initial training set 410. We use the notation $\Delta M$ for motion during training and for the estimated motions during tracking. The subscript i refers to sample in the training set, while the time index t refers to the estimated motion during tracking. In some embodiments, each current image 120 is used to update the training set during the tracking. This makes the regression function adaptive to changes in appearance and illumination.

The regression function $f: \mathfrak{R}^m \mapsto A(2)$ is an affine matrix. Therefore, the structure of affine matrices is considered.

The conventional method for linear motion estimation uses a parameterization of the motion $\Delta M(p)$, and linearizing around the initial value $$\Delta M(p_0 + \Delta p) \approx \Delta M(p_0) + \frac{\partial \Delta M}{\partial p} \Delta p. \quad (5)$$

Because the conventional transformations are around the identity matrix, the linearization is performed at $\Delta M(p_0)=I$. The conventional method proceeds by estimating the increments $\Delta p$.

There are two major disadvantages with the conventional method. First, the approximation makes a vector space assumption on the parameters. Second, the parameterization is arbitrary and does not consider the structure of the motion.

We use the Lie group algebra to train the regression function $f$ 140 from the training set 410. The motion transformations, $\Delta M$ 150, are modeled on the Lie algebra as a linear function of the descriptors o 130.

Lie Groups

A d-dimensional manifold is a topological space, which is locally similar to an Euclidean space. Every point on the manifold has a neighborhood for which there exists a homeomorphism, which maps the neighborhood to $\mathfrak{R}^d$ Differentiable manifolds satisfy smoothness constraints. Therefore, it is possible to define the derivatives of the curves on the manifold. The derivatives at a point M on the manifold lie in a vector space, which is the tangent space at that point. A Lie group is a group G with the structure of a differentiable manifold such that the group operations, multiplication and inverse, are differentiable maps. The tangent space to the identity element I of the group forms the Lie algebra g. We refer to points on the group with bold upper case letters and vectors on the Lie algebra with bold lower case letters.

Distances on the manifold are measured by the lengths of the curves connecting points, and a minimum length curve is called a geodesic From the identity element I, there exists a unique geodesic starting with the vector m$\in$g. The exponential map, exp: g$\to$G maps the vector m to the point reached by this geodesic. If exp(m)=M, then the length of the geodesic is $\rho(I, M)=\|m\|$. In general, the exponential map is onto but not one-to-one. Therefore, the inverse mapping log: G$\to$g is uniquely defined only around the neighborhood of the identity element I. If for any M$\in$G, there exist several m$\in$g such that M=exp(m), then log(M) is selected as the vector with the smallest norm. Left multiplication by the inverse of a group element $M^{-1}$: G$\to$G maps the point M to I and the tangent space at M to the Lie algebra, which is an isomorphism. Using the mapping and the geodesic definition, the distance between two group elements is measured by $$\rho(M_1, M_2) = \|\log(M_1^{-1} M_2)\|. \quad (6)$$

The transformations we use in the embodiments of the invention, such as affine motion A(2), similarity transform S(2), and Euclidean motion SE(2), are closed subgroups of the general linear group GL(3,R), which is the group of 3×3 nonsingular square matrices. The exponential map of a matrix and its inverse, logarithm map, are defined by $$\exp(m) = \sum_{n=0}^{\infty} \frac{1}{n!} m^n \quad (7)$$

$$\log(M) = \sum_{n=1}^{\infty} \frac{(-1)^{n-1}}{n} (M - I)^n.$$

In general, the exponential map does not satisfy the identity $\exp(m_1)\exp(m_2)=\exp(m_1+m_2)$. The mapping is defined by $\exp(m_1)\exp(m_2)=\exp(BCH(m_1, m_2))$, through Baker-Campbell-Hausdorff formula $$BCH(m_1, m_2) = m_1 + m_2 + \frac{1}{2}[m_1, m_2] + O(|(m_1, m_2)|^3), \quad (8)$$

where $[m_1, m_2]=m_1 m_2 - m_2 m_1$ is the Lie bracket operation. The structure of affine matrices is described above. The space is a six-dimensional manifold.

The Lie algebra of the affine group is the set of matrices $$m = \begin{pmatrix} U & v \\ 0 & 0 \end{pmatrix} \quad (9)$$

where, U is a 2×2 matrix and $v \in \Re^2$. The matrix m is sometimes referred to as a six-dimensional vector by selecting each of the entries of the matrix U and the vector v as an orthonormal basis.

Regression Function Training

During the training 480 based on the training set 410, the regression coefficients $\Omega$ 470 are estimated. The regression coefficients 470 correlate the object descriptors o with the motion transformations $\Delta M$. For the purpose of this description, the regression coefficients $\Omega$ 470 equivalent to the regression function 140.

The training set 410 includes the descriptors and the motion transformations $\{o^i_0, \Delta M_i\}$ as described above. The affine motion matrices do not lie on a vector space and the conventional Euclidean distance between two motions is not a valid metric.

However, affine motion matrices do lie on the differentiable manifold. In this case, a meaningful error function is a sum of the squared geodesic distances between the regression estimations, $f(o^i_0)$, and the motion transformations $\Delta M_i$ $$J_g = \sum_{i=1}^{n} \rho^2[f(o^i_0), \Delta M_i]. \qquad (10)$$

Let $M_1$ and $M_2$ be two motion matrices, and let $m_1 = \log(M_1)$ and $m_2 = \log(M_2)$. A first order approximation to the geodesic distance between the two motion matrices is $$\begin{aligned}\rho(M_1, M_2) &= \|\log[M_1^{-1} M_2]\| \\ &= \|\log[\exp(-m_1)\exp(m_2)]\| \\ &= \|\log[\exp(m_2 - m_1 + O(|(m_1, m_2)|^2))]\| \\ &\approx \|m_2 - m_1\|.\end{aligned} \qquad (11)$$

using BCH formula of Equation (8). If we select d orthonormal bases on the Lie algebra, then we can determine the matrix norm as the Euclidean distance between two vectors. From the BCH formula of Equation (8), and the definition of Lie bracket operation, the approximation is better for smaller transformations, such that $m_1$ and $m_2$ are close to zero, or equivalently $M_1$ and $M_2$ are close to identity matrix I. Using Equation (11), the error function of Equation (10) is equivalent to minimizing $$J_a = \sum_{i=1}^{n} \|\log(f(o^i_0)) - \log(\Delta M_i)\|^2, \qquad (12)$$

up to first order terms. Because the transformations are in a small neighborhood of the identity matrix, the approximation sufficiently accurate.

We define the regression function as $$f(o) = \exp(g(o)), \qquad (13)$$

and determine the function $g: \Re^m \mapsto \Re^d$, which estimates the tangent vectors, $\log(\Delta M)$, on the Lie algebra. We model the function g as a linear function of the descriptors $$g(o) = o^T \Omega, \qquad (14)$$

where $\Omega$ is the m×d matrix of regression coefficients. Let X be the n×m matrix of initial descriptors and Y be the n×d matrix of mappings of motions to the Lie algebra $$X = \begin{pmatrix} [o^1_0]^T \\ \vdots \\ [o^n_0]^T \end{pmatrix} \qquad (15)$$

$$Y = \begin{pmatrix} [\log(\Delta M_1)]^T \\ \vdots \\ [\log(\Delta M_n)]^T \end{pmatrix}.$$

The $\log(\Delta M_1)$ is referred here in d-dimensional vector form.

Substituting Equations (13) and (14) into Equation (12), we obtain $$J_\alpha = tr[(X\Omega - Y)^T(X\Omega - Y)], \qquad (16)$$

where the trace (tr) replaces the summation in Equation (12). The trace is a sum of the elements on the main diagonal. If we differentiate the error function $J_\alpha$ with respect to $\Omega$, then the minimum is $\Omega = (X^T X)^{-1} X^T Y$.

For real-time tracking, the number of descriptors is relatively small, e.g., n=200. Because the number of descriptors is smaller than the dimension of the feature space, m=432, n<m, the system is underdetermined and $X^T X$ becomes rank deficient. In this case, the estimate makes the training error zero. However, the error does not generalize to future predictions, which is called overfitting.

To avoid overfitting, we provide an additional constraint on the size of the regression coefficients $$J_r = tr[(X\Omega - Y)^T(X\Omega - Y)] + \lambda \|\Omega\|^2, \qquad (17)$$

which is a ridge regression. Ridge regression is useful for solving badly conditioned linear regression problems.

The minimum of the error function $J_r$ is $$\Omega = (X^T X + \lambda I)^{-1} X^T Y, \qquad (18)$$

where I is an m×m identity matrix. The regularization coefficient $\lambda$ determines the degree of shrinkage on the regression coefficients. Larger values of the coefficient $\lambda$ stabilize the motion, whereas smaller values allow larger motions from frame to frame. The optimum value of the coefficient $\lambda$ is selected by cross validation on a training sequence, with $\lambda$ remaining constant throughout the tracking.

Regression Function Update

The appearance of the object 115 can change over time. The amount of illumination in the scene can also change. This is particularly true for tracking objects in natural outdoor settings. Therefore, we update 450 the training set 410 according to the previously processed images and tracking regions.

In our embodiments, the model update 450 refers to re-estimating the regression function $f$ or equivalently the regression coefficients $\Omega$. During the tracking step, we generate a few, e.g., k=2, random descriptors for the tracking region 160 as described above. Let $X_u$ and $Y_u$ be the updated descriptors and motion transformations stored in the matrix form as described by Equation (15), and $\Omega'$ be the previous model parameters. After each p frames of tracking, we update the coefficients of the regression function by minimizing the error function $$J_u = tr[(X_u \Omega - Y_u)^T (X_u \Omega - Y_u)] + \lambda \|\Omega\|^2 + \gamma \|\Omega - \Omega'\|^2. \qquad (19)$$

This error function is similar to Equation (17).

We differentiate the error function $J_u$ with respect to the regression coefficient $\Omega$. The minimum is $$\Omega = (X_u^T X_u + (\lambda + \gamma) I)^{-1} (X_u^T Y_u + \gamma \Omega'). \qquad (20)$$

The parameter γ controls the amount of change allowed in the regression parameters from the last estimation.

Object Tracking

FIG. 6 shows pseudo code for our object tracking method. We train the regression function $f$ 140. The tracking estimates the motion 150 of the object, from image to image, using Equation (4) and updates 170 the location M using Equation (3).

The tracking can be improved by repeating the motion estimation with the regression function $f$. The iterations end when the estimated motion $\Delta M_t$ becomes equal to identity, or the likelihood of the object at the current estimated location becomes less than the likelihood of the object at the previous location. The likelihood of the object being at location M at time t is $$L(M,t)=\|o_t(M^{-1})-o_0(M_0^{-1}))\|^{-1}, \quad (21)$$

where the descriptor of the object at the previous location is compared with the descriptor of the object at the current location. Usually, one or two iterations per image are sufficient for tracking the object.

Object Detection

Figure 7:
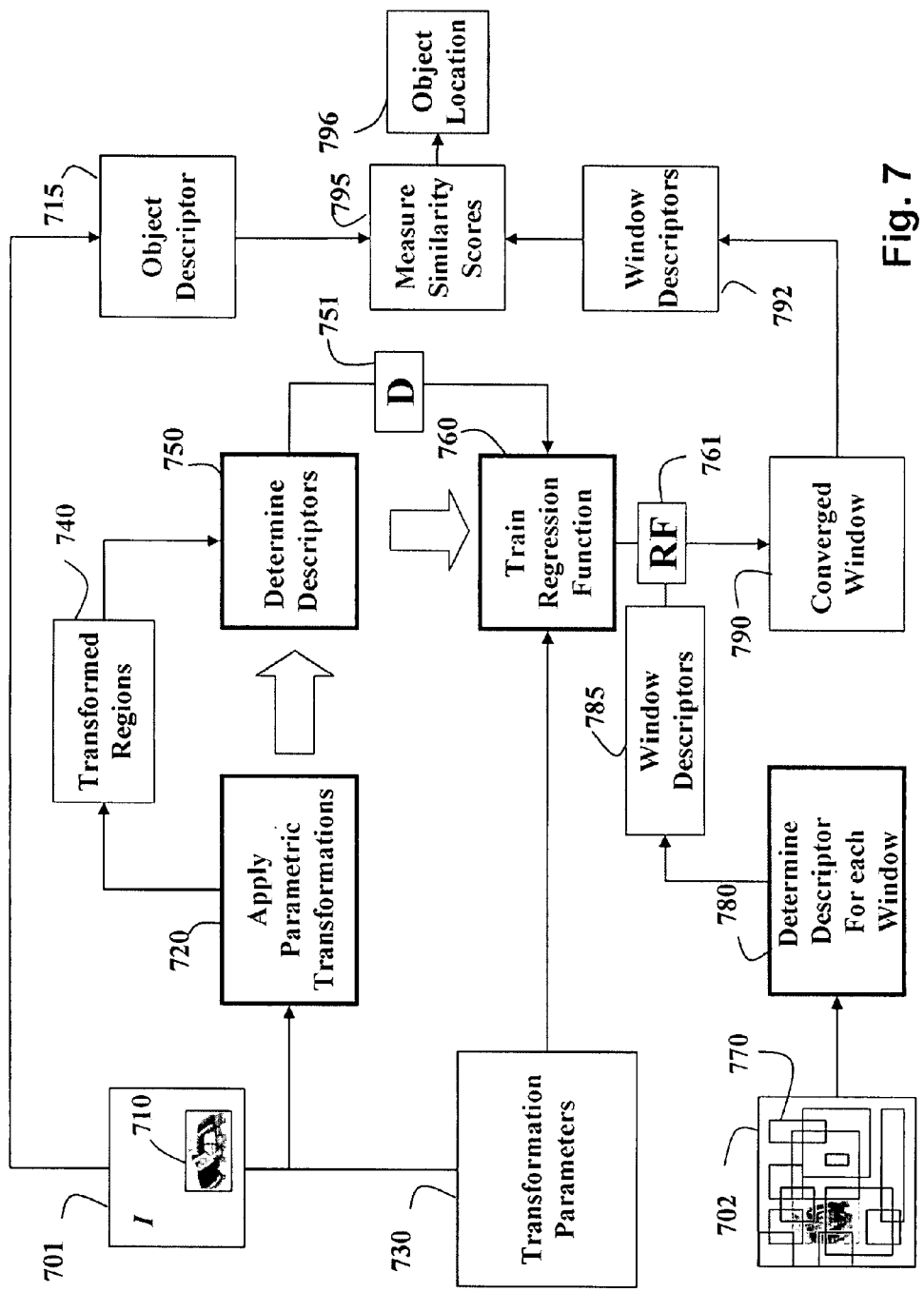
FIG. 7 is a flow diagram of a method for detecting an object in an image using the trained regression function of FIG. 4.

FIG. 7 shows a method for detecting an object region in a target image 702 according to embodiments of our invention. We begin with an (initial) training image 701 that includes the object in a training region 710. We do not known the relative pose of the object in terms of real world coordinates, or with respect to the pose of the object in the target image. By pose, we mean the 3D location and the 3D orientation of the object. For example, the view of the car in the training image can be from the side, while the view of the same car in the target image can be from the front. Because the pose can differ, the size of the object can also be different in the two images. We generate an object descriptor 715 from the training image 701, e.g., the descriptor is an orientation histogram as described above. Alternatively, other descriptors, e.g., appearance, statistics, can be used.

We apply multiple parametric transformations 720 to the training region 710 according to transformation parameters 730 to produce transformed regions 740. Typically, there are hundreds and hundreds of these transformations. Each transformation yields a different pose of the object. The transformation parameters 730 are mapped to the Lie algebra as described above.

We determine 750 a descriptor 751 for each transformed region 740. We map the descriptors 751 and parameters 730 to the Lie algebra and train 760 the regression function (RF) 761 as described above for FIG. 4.

We partition the target image 702 into windows 770. There are many windows of different sizes and locations because we do not know the size and location of the object in the target image. For each window, we determine 780 a window descriptor 785 and the regression function 760 to the descriptor by matrix multiplication to determine a converged window. For each converged window 790, we determine a window descriptor 792.

We measure 795 a similarity score between each window descriptor obtained from the target image 702 and the object descriptor obtained from the training region 701. The window with the highest similarity score corresponds to the location 796 of the detected object.

Detecting and Tracking in Other Dimensions

The above method for object detecting and tracking can be extended to other dimensions. For example, we can detect and track 3D objects in a 3D space. The parametric transformations and descriptors are defined in corresponding higher or in lower dimensions. For example, a 3D object can be defined by a surface map, volume data, or 3D range data.

EFFECT OF THE INVENTION

The method for detecting and tracking objects according to the embodiments of the invention has the following advantages over conventional object tracking.

The method uses orientation histograms for tracking motion, instead of the pixel intensities used in conventional methods. The histograms provide accurate estimations when the motion is large. The orientation histograms are also less sensitive to changes illumination and appearance of the object.

The method uses Lie algebra of a motion group, which can better estimate non-linear motion.

The method uses ridge regression to update the motion model in real-time.

The method can be used for tracking objects with any matrix Lie group structured motion.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for locating an object an image, comprising the steps of:
   applying a set of parametric transformations to a region in a training image to determine a set of transformed regions, wherein parameters of the parametric transformations are mapped to a Lie algebra, and the region includes an object;
   determining object descriptors for each transformed regions;
   training a regression function from the set of parametric transformations and the set of object descriptors;
   determining the object descriptor from a target image; and
   applying the regression function to the object descriptor of the target image to determine a location of the object in the target image;
   determining the object descriptor for each target image of a sequence of target images of a moving object;
   applying the regression function to each object descriptor to determine the location of the moving object, in which the location of the region at a time t is described by a location transformation matrix $M_t$, and the motion of the object at the time t is described by a motion transformations $\Delta M_t$, such that $M_t = M_{t-1} \cdot \Delta M_t$, in which the location of the region at a time t is described by a location transformation matrix $M_t$, and the motion of the object at the time t is described by a motion transformations $\Delta M_t$, such that $M_t = M_{t-1} \cdot \Delta M_t$, in which the location of the region at a time t is described by a location transformation matrix $M_t$, and the motion of the object at the time t is described by a motion transformations $\Delta M_t$, such that $M_t = M_{t-1} \cdot \Delta M_t$, in which the regression function is $f$, the object descriptor is $o(M^{-1}) \in \Re^m$ where m is a dimension of the object descriptor, and the motion transformations is $\Delta M_t = f(o_t(M_{t-1}^{-1}))$, wherein the steps are performed in a processor.

2. The method of claim 1, further comprising:
   updating a location of the region according to the location of the moving object.

3. The method of claim 1, in which the parametric transformations are affine.

4. The method of claim 1, in which the parametric transformations are perspective.

5. The method of claim 1, in which the images corresponds to depth maps.

6. The method of claim 1, in which each image is a volumetric data set, and the location is three-dimensional.

7. The method of claim 1, in which the parameters are mapped to the Lie algebra by a matrix logarithm operation.

8. The method of claim 1, in which the region is mapped to a unit region to determine the object descriptor.

9. The method of claim 1, in which the object descriptor is an orientation histogram.

10. The method of claim 1, in which the object descriptor is a covariance matrix.

11. The method of claim 1, in which the applying is repeated until a likelihood of the location of the moving object is less than a likelihood of a previous location of the object.

12. The method of claim 1, in which the object descriptors and the regression function are matrices, and the applying is a matrix multiplication.

13. The method of claim 1, further comprising:
updating coefficients of the regression function for each target image.

14. The method of claim 1, further comprising the steps of:
partitioning the target image into a plurality of windows;
determining the object descriptor for each window;
applying the regression function to the object descriptor of each window to determine a converged window for each window;
determining a window descriptor for each converged window;
comparing the object descriptor of the region with each window descriptor to determine a similarity score for each converged window; and
selecting the window associated with the converged window with a highest score as the location of the object in the target image.

* * * * *